United States Patent [19]
Rohl et al.

[11] 3,761,517
[45] Sept. 25, 1973

[54] PROCESS FOR THE CONTINUOUS PRODUCTION OF SATURATED ALIPHATIC DICARBOXYLIC ACIDS

[75] Inventors: Hermann Rohl; Werner Eversmann; Peter Hegenberg; Gerhard Hellemanns, all of Marl, Germany

[73] Assignee: Chemische Werke Huls Aktiengesellschaft, Marl, Germany

[22] Filed: Apr. 15, 1970

[21] Appl. No.: 28,564

[30] Foreign Application Priority Data
Apr. 16, 1969  Germany............... P 19 19 228.0

[52] U.S. Cl............................ 260/531 R, 260/537 P
[51] Int. Cl............................................. C07c 55/04
[58] Field of Search................... 260/531 R, 533 C, 260/537 P

[56] References Cited
UNITED STATES PATENTS
2,878,276   3/1959   Crowley..................... 260/533 C X
2,844,626   7/1958   Kamlet....................... 260/531 R X
3,290,367   12/1966  White et al. ................. 260/531 R FOREIGN PATENTS OR APPLICATIONS
567,525    2/1945   United Kingdom............. 260/533 C
1,428,374  7/1966   France............................ 260/531 R OTHER PUBLICATIONS
VanAsselt et al. Preparation of Adipic Acid Rec. Trav. Chem. Pays–Bas 82 (1963) pgs. 54–61

Primary Examiner—Lorraine A. Weinberger
Assistant Examiner—Richard D. Kelly
Attorney—Millen, Raptes & White

[57] ABSTRACT

Process for the production of adipic acid and other aliphatic dicarboxylic acids by the continuous catalytic nitric acid oxidation of cyclohexanol or cyclohexanon and other cycloalkanols and cycloalkanones in which the weight ratio of nitric acid to organic compound is 5 : 1 to 20 : 1, the oxidation temperature is 20° to 50° C., the residence time is 20 to 70 minutes and the nitrogen oxides produced in the oxidation are recycled.

17 Claims, 1 Drawing Figure

PATENTED SEP 25 1973
3,761,517
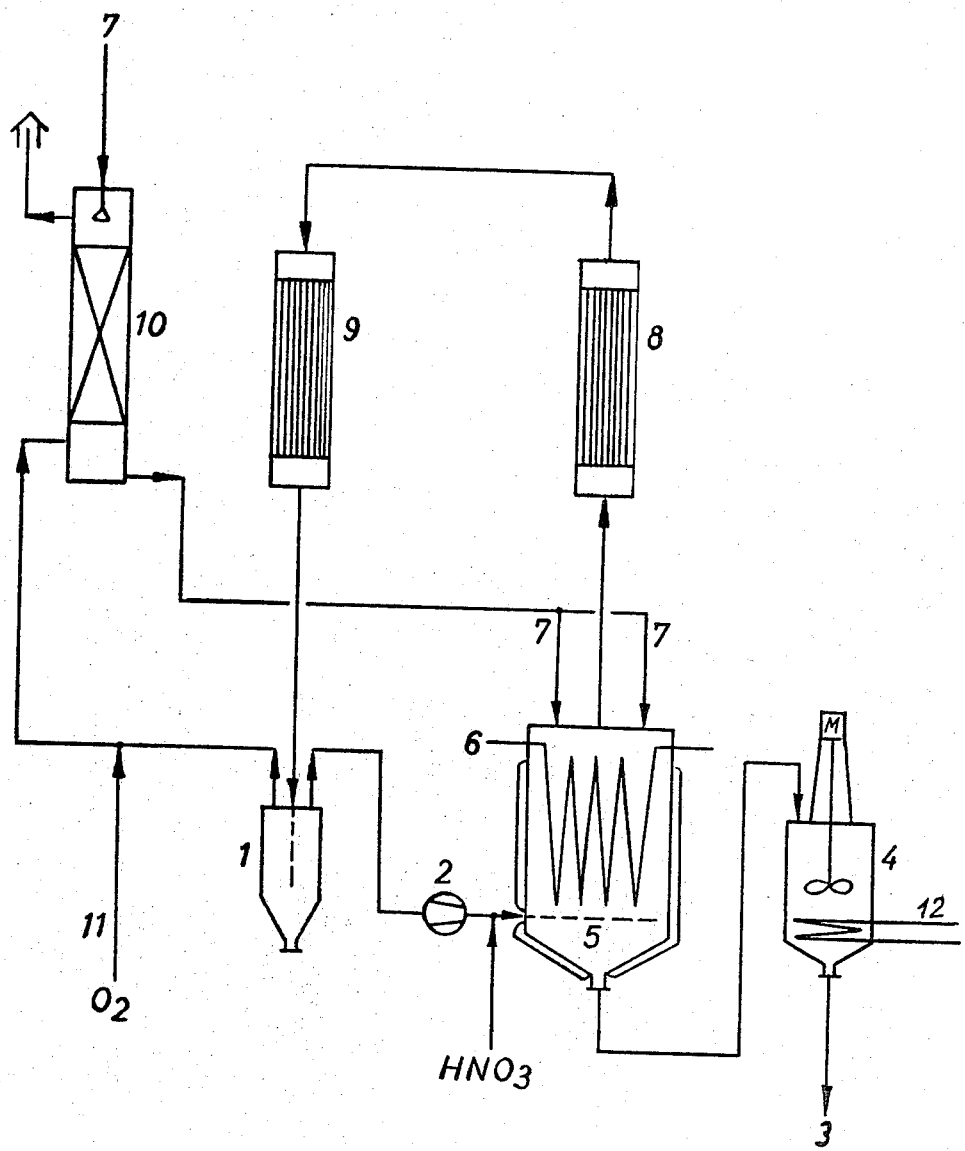
INVENTORS
DR. HERMANN ROHL
WERNER EVERSMANN
DR. PETER HEGENBERG
ERHARD HELLEMANNS
*Millen, Carter & White*
ATTORNEYS

PROCESS FOR THE CONTINUOUS PRODUCTION OF SATURATED ALIPHATIC DICARBOXYLIC ACIDS

BACKGROUND OF THE INVENTION

This invention relates to the continuous catalytic nitric acid oxidation of cycloalkanols and cycloalkanones to aliphatic dicarboxylic acids.

It is conventional to oxidize cycloalkanols or cycloalkanones, or mixtures thereof, to the corresponding saturated aliphatic dicarboxylic acids with nitric acid in the presence of catalysts or catalyst systems. Such an oxidation can be represented by the following formula:

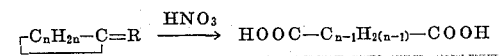

wherein R is

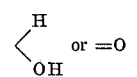

and $C_nH_{2n}$ is a divalent aliphatic group containing, e.g., five to 15 carbon atoms, of which all or a portion are ring carbon atoms and the remainder aliphatic hydrocarbon substituents such as, for example, lower-alkyl, e.g., one to three methyl groups.

In Swiss Patent 120,518 is described a noncontinuous process for the preparation of adipic acid wherein cyclohexanol or a cyclohexanol-containing product is oxidized with 65 percent (by weight) nitric acid at a temperature of 20°–30° C. The long reaction times required to reach an acceptable conversion are a considerable disadvantage and the process has not found acceptance in industry.

A continuous process for the production of saturated aliphatic dicarboxylic acids is known from U.S. Pat. No. 2,439,513, wherein the oxidation of the cycloalkanols and/or cycloalkanones is conducted with approximately 60 percent nitric acid in the presence of a vanadate-containing catalyst at a temperature of 50°–150° C. and at pressures of 1.0 – 35 atmospheres gauge. In U.S. Pat. No. 2,557,282, this method is varied by dividing the temperature range into two stages, the first being conducted at 40°–90° C. and the second at 95°–100° C. Also, the points at which the inorganic and the organic phases are introduced are disposed at different places of the reaction chamber of the reaction stage having a temperature of 60° C. The activity of the vanadate catalyst is enhanced by additions of copper. The yields are stated to be, in the examples in which adipic acid is produced, between about 60 percent and maximally somewhat above 90 percent. However, when the oxidation is conducted at temperatures of about 100° C., it has been found that considerable degradation of the organic reactants occurs. The above-mentioned processes can be used with starting materials having a higher number of carbon atoms. However, because of the additional difficulties encountered in the production of higher dicarboxylic acids, only the catalytic nitric acid oxidation of cyclohexanol and other derivatives of cyclohexane has heretofore attained a large-scale industrial importance.

Difficulties result when attempting to employ the reaction conditions used in industrial adipic acid production for the preparation of higher saturated aliphatic dicarboxylic acids and, specifically, for the preparation of 1,10-decanedicarboxylic acid. One reason is the structure of the thus-formed intermediate compounds and the mechanism of the decomposition reactions thereof is more complicated. Another reason is the $C_{12}$-dicarboxylic acids, for example, exhibit solubility characteristics in the reaction medium quite different from adipic acid. The latter disadvantage can be overcome by introducing a saturated fatty acid of two to five carbon atoms as a solubilizer for the starting material or final product, which solubilizer also increases the oxidation rate and the yield in dicarboxylic acid (German Patent 1,154,452).

Such a process is not only expensive, because of the additional agents employed, it is also technically complicated, since it requires additional distillation stages during the working-up process of the acid-containing mother liquor.

In another conventional process for the preparation of higher dicarboxylic acid (German Published Application 1,238,000), the amount of nitric acid is greatly increased in order to obtain a homogeneous phase. By using a very large excess of nitric acid, based on the amount stoichiometrically required for the reaction, it is possible to maintain the desired proportion of solids in the reaction mixture in solution. The main disadvantage of this method is it is necessary to handle very large amounts of a highly reactive and corrosive liquid at higher temperatures.

In German Published Application OS 1,912,569, another process is described for the production of straight-chain dicarboxylic acids. In this process, the ketone/alcohol mixture is oxidized in two stages at temperatures in the range of 75°–120° C. Elevated pressures are preferred. It is important that the process is conducted in the liquid phase. Due to the high temperatures, it is not possible to operate with concentrated nitric acid, since the reaction medium is too reactive at the required temperatures. In contradistinction, in the process of this invention, it is readily possible to employ concentrated nitric acid and it is unnecessary to keep the reaction mixture in the liquid phase.

OBJECTS OF THE INVENTION

It is an object of this invention to provide a continuous process for the production of dicarboxylic acids by the catalytic nitric acid oxidation of cycloalkanols and/or cycloalkanones which lacks most or all of the above-described disadvantages of the known processes. It is another object to provide a process which can be employed industrially with equal success for the production of adipic acid and decanedicarboxylic acid and other higher dicarboxylic acids. Other objects will be apparent to those skilled in the art to which this invention pertains.

SUMMARY OF THE INVENTION

According to this invention, saturated aliphatic dicarboxylic acids are produced in a continuous process by the catalytic nitric acid oxidation at about 20° to 50° C. of the corresponding cycloalkanols, cycloalkanones or mixtures thereof, employing an excess of nitric acid and recycling the nitrogen oxides produced during the oxidation to the reaction mixture.

DETAILED DISCUSSION

Suitable starting compounds are cycloaliphatic alcohols and ketones and mixtures thereof, e.g., those containing six to 16 carbon atoms in the ring, such as, for example, cyclohexanol, cyclohexanone, trimethylcyclohexanol, tert.-butylcyclohexanol, cyclododecanol, cyclododecanone, cyclotetradecanol, cyclohexadecanol, or cyclohexadecanone. Preferred are cycloaliphatic alcohols, ketones and mixtures thereof containing six to 12 carbon atoms in the ring. Especially preferred are those containing eight to 12 carbon atoms in the ring.

The nitric acid employed in the oxidation can vary fairly widely in strength and purity. In most cases, about 50–70 percent nitric acid gives best results.

The reactor temperature during the oxidation of the reaction mixture is of great importance to the trouble-free performance of the continuous reaction, as well as to the quality of the dicarboxylic acid reaction product. The lower the oxidation temperature, the higher is the yield of the desired dicarboxylic acid as the reaction product. Therefore, in order to conduct the oxidation efficiently at as low a temperature as possible, oxidation catalysts are employed in the oxidation.

As with the known processes, compounds of mercury, manganese, chromium, and copper can be employed as catalysts, e.g., $Hg(NO_3)_2 \cdot H_2O$, $Cr(NO_3)_3 \cdot 9 H_2O$, $Cu(NO_3)_2 \cdot 3 H_2O$, $Mn(NO_3)_2 \cdot 6H_2O$. However, a vanadium-containing catalyst is preferably employed, e.g., $NH_4VO_3$, $NaVO_3$, or $V_2O_5$. The amount of such catalyst is not critical and can vary from about 0.01 to 0.5 percent, preferably about 0.03 percent by weight of vanadium, based on the inorganic phase. Higher concentrations of catalyst are unnecessary and can result in a discoloration of the crude product, which requires additional purification measures in the separating stage. Lower concentrations can reduce the reaction rate.

Co-catalysts, such as, for example, iron, chromium, and especially copper, which are generally employed for obtaining a more effective progress of the oxidation, are generally unnecessary in the process of the present invention, but can be employed, if desired.

Although oxidation catalysts permit lowering the oxidation temperature, the temperature cannot be lowered arbitrarily, even when using an oxidation catalyst, because the effectiveness of the catalyst is impaired as the temperature is lowered. If too low an oxidation temperature is employed, the change in valence of the catalyst does not take place sufficiently rapidly, and the desired oxidation reaction is interrupted. It can thus be seen that rapid regeneration of the catalyst has a positive effect on the effectiveness of the catalysts.

An important aspect of the process of this invention is the recycle of a portion of the gases produced during the oxidation back to the reaction stage, i.e., to the oxidation reactor. Such recycle makes full use of the oxidizing value of the nitrous gases, and permits the use of lower oxidation temperatures, as well as preventing the reactor from clogging, preventing insufficient heat exchange and reducing air pollution.

Because of the recycling of the nitrogen oxide-containing gases in the oxidation stage in the process of this invention, and because the solubility of the nitrogen oxides in the reaction mixture rises with decreasing temperature, the change in valence of the catalyst is accelerated, so that the activity thereof is increased rather than decreased as the temperature is lowered and the nitrogen oxides are satisfactorily decomposed at the lower oxidation temperatures.

As a result of the recycle of the oxidation gases, an oxidation temperature can be employed which is lower than the customary oxidation temperature, without there being a reduction in the oxidation rate. As a result of the recycling of the nitrogen oxides produced in the process of this invention, the oxidation can be conducted at extremely mild reaction temperatures, e.g., about 20°–50° C., preferably about 30°–40° C. At these temperatures, precipitation of the dicarboxylic acid oxidation product occurs immediately as it is formed thus avoiding the degradation thereof. Additional advantages of the process of this invention are (a) the concentration of the oxidizing agents can be increased with resultant improved utilization of the nitric acid; (b) removal of the heat of reaction is enhanced because only a minor amount of dicarboxylic acid oxidation product is dissolved in the reaction liquid at the oxidation temperatures employed in the process of this invention; (c) because of the strong turbulence created by the recycling of the gases, crystallization deposits on the cooling surfaces, which reduces heat transfer efficiency, is avoided; and (d) air pollution caused by the nitrogen oxides produced during the oxidation is virtually reduced and, by using a scrubbing stage, eliminated.

Surprisingly, blowing only air through the reaction mass, rather than recycling the nitrogen oxides, results in the immediate termination of the oxidation reaction.

A large molar excess of nitric acid is employed in the oxidation stage. The weight ratio of nitric acid to the organic compound employed therein usually ranges between 5 : 1 and 20 : 1, preferably 8 : 1 to 16 : 1.

By employing the reaction conditions of this invention, viz., at low temperatures and cycling of the nitrogen oxide-containing gases, surprisingly, it is possible to obtain in a single reaction stage dicarboxylic acids having nitrogen contents of about 0.2 to 0.02% N.

In the process of this invention, the residence time for the maximum yield of dicarboxylic acids varies with the number of carbon atoms in the starting compounds to be oxidized. Generally, residence times will vary from about 20 to 70 minutes. Too short a residence time will result in impure reaction products, even at higher oxidation temperatures. For example, in $C_{12}$-dicarboxylic acid production, with a charging weight ratio of nitric acid to cyclododecanol mixture of 8 : 1 and oxidation temperature of 60° C., undesired oily by-products are formed with poor $C_{12}$-dicarboxylic acid yields if the residence time is considerably shorter than 20 minutes. At lower temperatures and longer residence times, no such disadvantageous features are encountered, so long as the nitrogen oxides produced during the oxidation are recycled. The exact residence time will generally be chosen so that a satisfactory space/time efficiency is achieved.

In the process of this invention, a crystalline slurry is obtained in the oxidation stage which consists of the desired dicarboxylic acid and, in some cases, lower dicarboxylic acids and organic nitrogen-containing intermediates. In a preferred embodiment, particularly in the production of higher dicarboxylic acids, i.e., eight to 16 carbon atoms, a post-reaction of the crystalline oxidation slurry is conducted in a subsequent second stage, in order to decompose the nitrogen-containing intermediate organic compounds produced in the oxidation stage. In this stage, the oxidation reaction mixture is heated to a temperature above the oxidation temperature, e.g., 50° to 100°C., preferably about 70-

90°C. Usually about 5 minutes to 180 minutes are required for completion of the post reaction. On the average, the nitrogen content, for example, of the $C_{12}$-dicarboxylic acid is thus lowered to about one-tenth its original value.

The nitrogen oxides produced during the nitric acid oxidation of the selected starting compound are recycled to the oxidation stage and thus decomposed.

The excess nitrogen oxides can be converted to nitric acid in a conventional manner. When conducting the process of this invention in a continuous fashion, the ratio of the nitrogen oxides produced in this reaction to the total amount of recycle gas is usually about 1 : 10. This ratio factor of the amount of recycle gas can readily be increased or decreased by altering the velocity of the recycling gases.

The process can be conducted at ambient or at an elevated pressure. At elevated pressures, the solubility of the nitrogen oxides in the reaction mixture is increased, which improves oxidation conditions. However, the process can be carried out most economically at a pressure of 0 to 1 atmospheres gauge. Thus, an especially preferred pressure is ambient pressure.

In a further preferred embodiment, a portion of the recycle gas equivalent to the amount of gas produced during the oxidation reaction, is withdrawn from the recycled gases and mixed with a quantity of oxygen equivalent to its NO-content. This gas mixture is then fed countercurrently to a scrubbing column. A suitable scrubbing liquid is the cyclic alcohol or ketone or mixture thereof used as a starting material for the oxidation. Other suitable scrubbing liquids are, e.g., long chain aliphatic fluid alcohols such as octanol, nonanol, decanol.

The temperature of the scrubbing column can vary widely, e.g., 20°–200° C., but preferably is about 20°–80° C. The pressure therein will be that required to maintain the current of oxidation gases recycling to the oxidation stage. Generally, it is in the range of 0–3 atmospheres gauge, preferably about ambient pressure.

The scrubbing liquid is preferably recirculated in the scrubbing column. To maintain a constant ratio of unoxidized scrubbing liquid to oxidized scrubbing liquid, a portion of the stream of scrubbing liquid is withdrawn. When the cyclic alcohol or ketone used as starting material in the oxidation stage is used as scrubbing liquid, the withdrawn portion can be fed to the oxidation stage. Generally, for every 6–10 parts of scrubbing liquid being circulated in the scrubbing stage, about one part thereof is withdrawn and, in the case of the cyclic alcohols and ketones, fed to the reactor.

The gas scrubbing stage is preferably designed so that the entire amount of the starting cyclic alcohol and/or ketone is passed through the scrubbing stage as the scrubbing liquid. In such a system, the flow of liquid in the scrubbing stage will preferably be about 6–10 times that flowing through the oxidation stage. It is, of course, also possible to employ only a portion of the starting material in the scrubbing stage as the scrubbing liquid, the remainder being fed directly to the oxidation stage. However, the former mode of operation is preferred. In either case, the amount of starting material fed to the scrubbing stage corresponds to the amount withdrawn therefrom.

The gas scrubbing step can also be executed in two stages in which pre-purified scrubbed gas coming from the first stage is treated countercurrently in a second stage with fresh scrubbing liquid.

The gas discharged from the gas scrubbing stage is practically free of nitric oxides, thus avoiding air pollution problems.

With reference to the drawing, there is illustrated an arrangement for conducting the process of this invention.

As shown in the drawing, nitric acid and the starting cyclic organic compound 7 are continuously introduced into the reactor 5. A cycle gas blower 2, draws the nitric oxides produced during the oxidation from the top of reactor 5 and recycles them via condenser 8, cooler 9 and separator 1, into the lower section of reactor 5. The heat liberated during the oxidation is removed by indirect heat exchange in cooler 6. The liquid reaction slurry is passed to the heated post-reaction stage 4, and from there to a working-up stage 3 (not shown). In post-reaction stage 4, the required temperature is maintained by heating coils 12. The excess nitrogen oxide-containing gases are drawn from separator 1 and mixed with the oxygen required to decompose them at 11. The resultant mixture of gases is passed through the scrubber 10 counter-current to a stream of fresh starting material 7 which is introduced into the top of scrubber 10 and circulated internally therein. A portion of the scrubbing liquid 7 is then introduced into the top of reactor 5 at a rate corresponding to the rate at which dicarboxylic acid product is withdrawn in the liquid slurry 3.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In Tables 1–4 below, experimental results are set forth along with those of a comparative example (No. 1). The experiments were conducted in the above-described process scheme. The reaction was carried out at ambient pressure.

The starting compound for Runs 1–4 was cyclododecanol/one; for Run 5, cyclooctanol/one; for Run 6, cyclohexanol; and for Run 7, trimethylcyclohexanol (mixture of isomers).

TABLE 1

| Run | Amount of $HNO_3$ (kg/hr) | Concentration % by weight | Amount ol/one (kg/hr) | Concentration –ol % by wt. | Concentration –one % by wt. |
|---|---|---|---|---|---|
| 1 | 16.0 | 65.0 | 2.0 | 78.0 | 21.0 |
| 2 | 16.0 | 65.0 | 2.0 | 78.0 | 21.0 |
| 3 | 4.8 | 65.0 | 0.6 | 78.0 | 21.0 |
| 4 | 20.0 | 65.0 | 2.0 | 99.8 | 0.2 |
| 5 | 1.0 | 65.0 | 0.1 | 98.0 | 2.0 |
| 6 | 2.8 | 64.4 | 0.23 | 99.0 | |
| 7 | 2.1 | 64.8 | 0.176 | 100.0 | |

TABLE 2

| Run | Process Stage 1 temperature (°C.) | Catalyst mg. of vanadium/ kg of acid | Residence Time (min) |
|---|---|---|---|

| | | | |
|---|---|---|---|
| 1 | 63 | 320 | 20 |
| 2 | 40 | 320 | 40 |
| 3 | 30 | 320 | 60 |
| 4 | 38 | 320 | 40 |
| 5 | 37 | 320 | 70 |
| 6 | 40 | 320 | 70 |
| 7 | 39 | 320 | 70 |

TABLE 3

Process Stage 2 (Post Reaction)

| Run | Temp (°C) | residence time (min.) | % N prior to post reaction | % N after post reaction |
|---|---|---|---|---|
| 1 | 70 | 120 | 0.35 | 0.061 |
| 2 | 85 | 15 | 0.15 | 0.020 |
| 3 | 85 | 15 | 0.12 | 0.015 |
| 4 | 90 | 10 | 0.11 | 0.015 |
| 5 | 85 | 20 | 0.05 | 0.04 |
| 6 | | | 0.017 | |
| 7 | | | 0.06 | |

TABLE 4

Final Products

| Run | $C_{12}$-Di-acid (kg/hr) | $C_{11}$-Di- (kg/hr) | $C_{10}$-Di-acid and lower Dicarboxylic acids (kg/hr.) | $C_{12}$-Di-acid yield, in %, based on ol/one mixture employed |
|---|---|---|---|---|
| 1 | 1.9 | 0.407 | 0.088 | 77.0 |
| 2 | 2.29 | 0.046 | 0.016 | 95.0 |
| 3 | 0.722 | 0.024 | 0.008 | 95.9 |
| 4 | 2.405 | 0.016 | 0.002 | 96.5 |
| 5 | 0.128[a] | | | 94.2 |
| 6 | 0.326[b] | | | 98.2 |
| 7 | 0.227[c] | | | 95.3 |

[a] Suberic Acid
[b] Adipic Acid
[c] Trimethyladipic Acid (mixture of Iosmers)

TABLE 5.—DEGRADATION OF THE NITRIC OXIDES

| Reaction temperature | Ratio of $HNO_3$:$C_{12}$-ol/one | Composition of the waste gases |||||
|---|---|---|---|---|---|---|---|
| | | $N_2$ | $N_2O$ | NO | $NO_2$ | $CO_2$ | CO |
| (a) Without gas cycling—70° C.. | 8:1 | 5 | 35 | 28 | 20 | 10 | 2 |
| Oxidation value of $HNO_3$=433 g. $O_2$/kg. $HNO_3$ |||||||
| (b) With gas cycling—38° C.... | 8:1 | 11 | 76 | 2 | 7 | 4 | 0 |
| Oxidation value of $HNO_3$=508 g. $O_2$/kg. $HNO_3$ ||||||| nitrous gases (cycle gas) was terminated, and the oxidation was continued at an excess pressure of 1 atmosphere gauge. In this process, the oxidation reaction proper shifted to the post reactor, where the unreacted portion of the reaction mixture continued to react at 90° C. until the reaction was finished. Under these reaction conditions, 6 percent of $C_{11}$-dicarboxylic acids were formed, calculated on the charged starting material.

After 10 hours, the experiment was terminated because the degree of conversion in the main oxidation reactor became so low and the main reaction was taking place in the post reactor, placing an overload on the cooling capacity of the post reactor.

The experiment demonstrates that the process can be conducted at low temperatures only when the nitrous gases produced during the oxidation reaction are recycled to the oxidation reactor.

EXAMPLE 3

Eight hundred l/h of the nitrous-oxide-containing waste gas was mixed with an amount of pure oxygen equivalent to the NO-content, and washed countercurrently in two stages. In the lower section of the scrubbing column, the flow of internally cycling scrubbing liquid (91 percent of cyclododecanol — 9 percent of cyclododecanone) was maintained at about 10 m³/m²h. The upper part of the scrubbing column was charged with 5 kg/h of scrubbing liquid, the same amount being continuously transferred to the oxidation reaction after treatment with the nitrous gases.

Experiment 1 was conducted in accordance with the process of this invention, i.e., an amount of the recycled gases corresponding to the quantity of gas produced during the oxidation is mixed with $O_2$ and then scrubbed.

In Experiments 2 and 3, the waste gases are not recycled. Additionally, in Experiment 2, no $O_2$ is added.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and

TABLE 6

| Experiment No. | Composition of the gases[1] (vol.-percent) |||| Amount of oxygen added (l./h.) | Composition of the scrubbing liquid after the scrubbing step (vol.-percent) ||| Post-reaction temp. (° C.) |
|---|---|---|---|---|---|---|---|---|---|
| | Prior to scrubbing || After scrubbing || | $C_{12}$-ol | $C_{12}$-one | $C_{12}$-nitrite | |
| | NO | $NO_2$ | NO | $NO_2$ | | | | | |
| 1 | 2 | 7 | <0.05(Σ) | | 10 | 78.4 | 11.5 | 10.1 | 70–75 |
| 2 | 5 | 19 | 2 | <0.1 | | 62 | 15 | 23 | 80 |
| 3 | 24(Σ) | | 0 | <0.1 | 22 | 57 | 16 | 27 | 80 |

[1] Amount of gases: 800 l./h.

EXAMPLE 2

(COMPARATIVE EXPERIMENT)

This experiment was conducted approximately in accordance with the reaction conditions of the process of U.S. Pat. No. 2,557,282.

The oxidation reactor was charged with 1,000 kg. of $HNO_3$ (63 percent by weight) and 100 kg. of cyclododecanol/one-mixture per hour at 40° C. with a residence time of 120 minutes. The catalyst concentration corresponded to that set forth in Example 1.

After the reaction had started, the recycling of the scope thereof, can make various changes and modifications of the invention to adapt it to various usages and conditions.

What is claimed is:

1. In a continuous process for the production of saturated aliphatic dicarboxylic acids by the catalyzed oxidation of the corresponding cycloalkanols, cycloalkanones, or mixtures thereof, containing six to 16 carbon atoms in the ring, with nitric acid and a mercury, manganese, chromium, copper or vanadium oxidation catalyst, the improvement which comprises:

a. using a weight ratio of nitric acid to organic starting material of about 5:1 to 20:1;

b. conducting the oxidation at a temperature of about 20° to 50° C., whereby precipitation of the dicarboxylic acid oxidation product occurs immediately as it is formed; and c. recycling at least a portion of the nitrogen oxides produced during the nitric acid oxidation to the oxidation stage, whereby the oxidation catalyst is regenerated by decomposition of the recycled nitrogen oxides.

2. A process according to claim 1 wherein a residence time of about 20–70 minutes is employed.

3. A process according to claim 1 wherein the oxidation is conducted at a temperature range of about 30°–40° C.

4. A process according to claim 1 wherein the oxidation is conducted at a pressure of about 0–1 atmosphere gauge.

5. A process according to claim 1 wherein the oxidation is conducted at about ambient pressure.

6. A process according to claim 1 wherein a weight ratio of nitric acid to organic starting material of about 8 : 1 to 16 : 1 is employed.

7. A process according to claim 1 wherein the organic starting material contains eight to 12 carbon atoms in the ring.

8. A process according to claim 1 wherein a residence time of about 20–70 minutes is employed; and wherein the oxidation is conducted at a pressure of about 0–1 atmosphere gauge.

9. A process according to claim 1 wherein the oxidation is conducted at a temperature range of about 30°–40° C.; wherein the oxidation is conducted at about ambient pressure; wherein a weight ratio of nitric acid to organic starting material of about 8 : 1 to 16 : 1 is employed; and wherein the organic starting material contains eight to 12 carbon atoms in the ring.

10. A process according to claim 9 wherein a portion of the nitrogen oxide-containing recycled gases are mixed with an amount of gaseous oxygen equivalent to the NO-content thereof before feeding this gas mixture to a scrubbing column, wherein all of the organic starting material employed in the oxidation stage is first employed as scrubbing liquid in the scrubbing stage; and wherein the scrubbing stage is conducted at a temperature of about 70°–90°C. and a pressure of about 0–3 atmospheres gauge.

11. A process according to claim 1 wherein the catalyst is a vanadium catalyst.

12. A process according to claim 11 wherein the catalyst is $NH_4VO_3$, $NaVO_3$ or $V_2O_5$.

13. A process according to claim 1 wherein a portion of the nitrogen oxides produced during the nitric acid oxidation is withdrawn, mixed with an amount of gaseous oxygen equivalent to the NO-content thereof and washed with a scrubbing liquid in a scrubbing stage, and the scrubbing liquid is then introduced into the oxidation stage.

14. A process according to claim 13 wherein the scrubbing liquid is the organic starting material employed in the oxidation stage.

15. A process according to claim 14 wherein all of the organic starting material employed in the oxidation stage is first employed as scrubbing liquid in the scrubbing stage.

16. A process according to claim 14 wherein the scrubbing stage is conducted at a temperature of about 70°–90° C. and a pressure of about 0–3 atmosphere gauge.

17. The process according to claim 13 wherein the oxidation catalyst comprises a vanadium-containing catalyst.

* * * * *